June 20, 1950
L. A. STENGEL
2,512,587
METHOD OF TEMPERATURE CONTROL IN
NITRATION OF HYDROCARBONS
Filed June 8, 1949
3 Sheets-Sheet 2
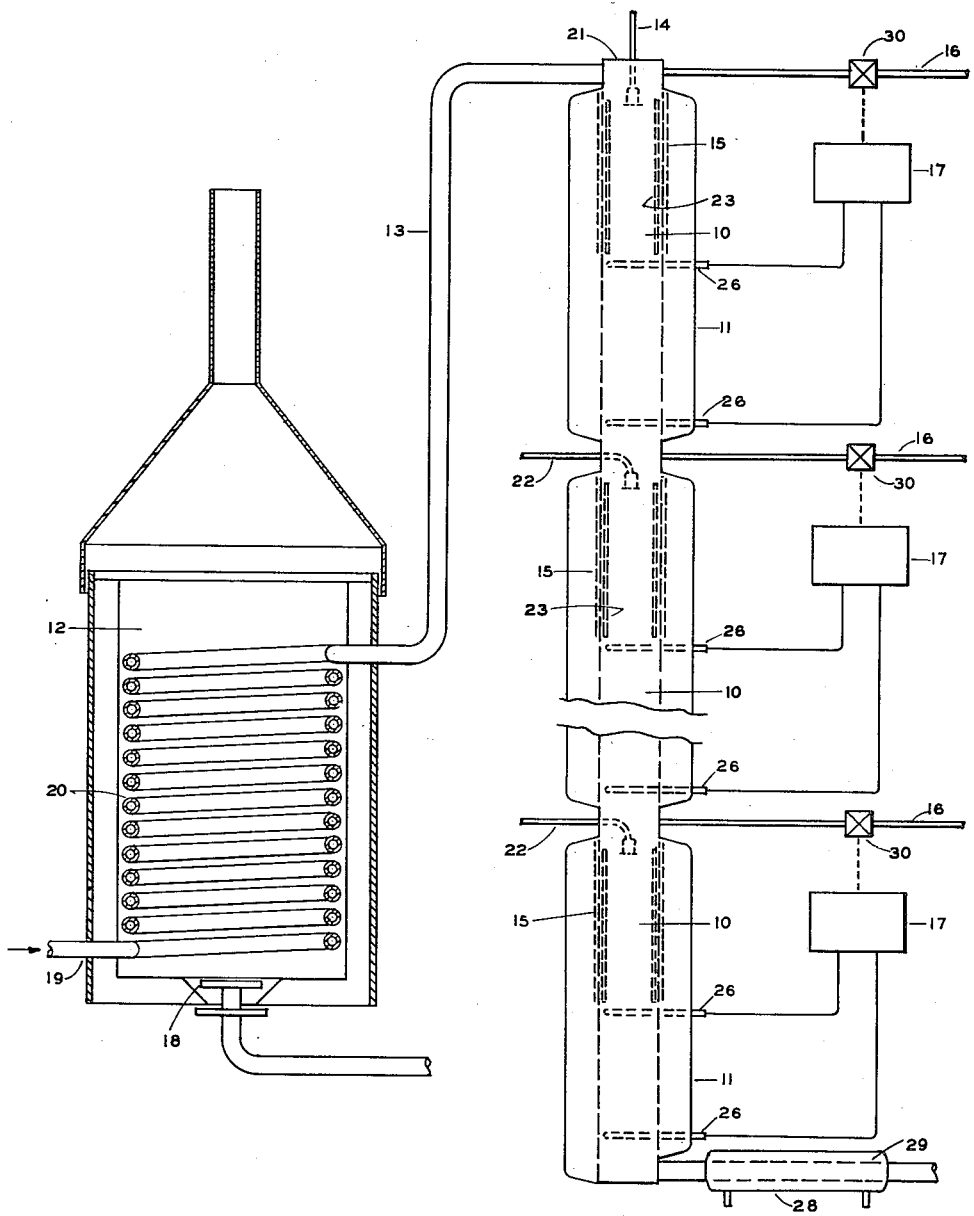
FIG. II
INVENTOR
Leonard A. Stengel
BY Francis M. Crawford
ATTORNEY June 20, 1950
L. A. STENGEL
2,512,587
METHOD OF TEMPERATURE CONTROL IN
NITRATION OF HYDROCARBONS
Filed June 8, 1949
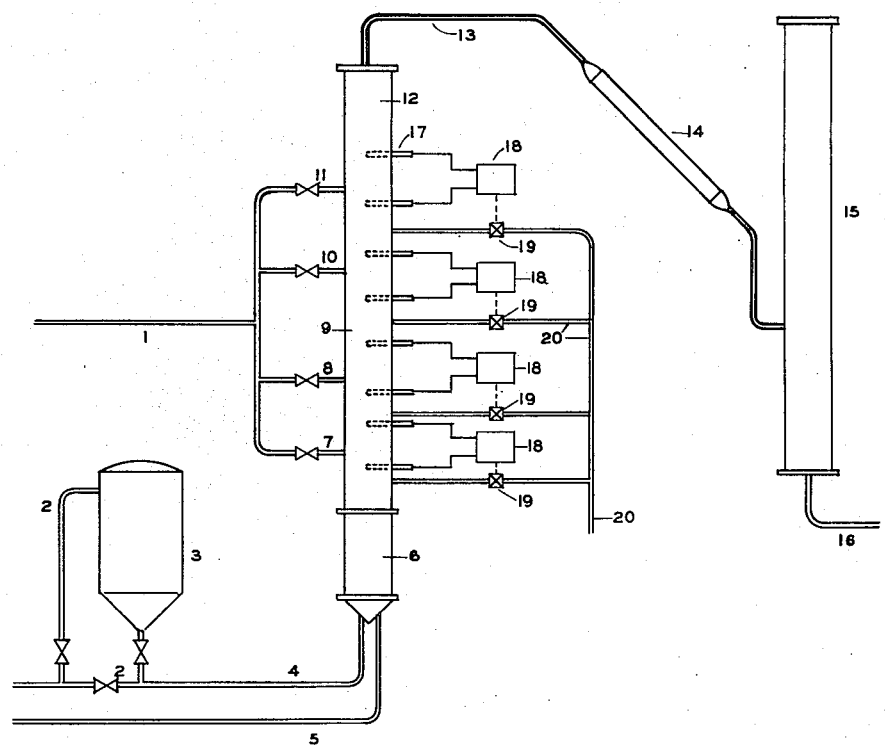
FIG. III.
INVENTOR
Leonard A. Stengel
BY Francis M. Crawford
ATTORNEY Patented June 20, 1950

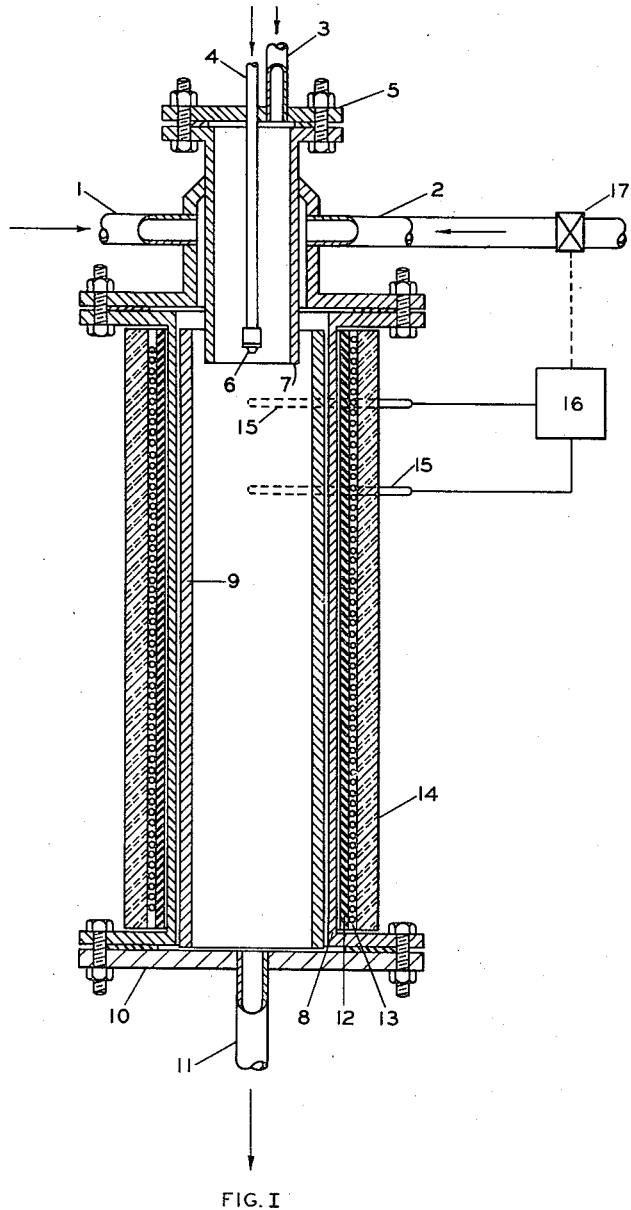
FIG. I

2,512,587

UNITED STATES PATENT OFFICE 2,512,587

METHOD OF TEMPERATURE CONTROL IN NITRATION OF HYDROCARBONS

Leonard A. Stengel, Terre Haute, Ind., assignor to Commercial Solvents Corporation, Terre Haute, Ind., a corporation of Maryland Application June 8, 1949, Serial No. 97,833

13 Claims. (Cl. 260—644)

The present invention relates to a process for the vapor phase nitration of the lower saturated hydrocarbons, and more particularly to a method whereby the temperature of the nitration reaction is conveniently controlled by the addition to the reaction zone of oxygen, air or other gaseous mixtures containing free oxygen as more particularly described hereinafter.

This case is a continuation-in-part of my application, U. S. Serial No. 685,956, filed July 24, 1946.

In carrying out vapor-phase nitration of saturated hydrocarbons in the past, it has been the practice to separately vaporize the hydrocarbons and nitric acid, and after mixing the reactants in a mixing chamber, passing the combined vapors into a reaction chamber in which is supplied additional heat sufficient to bring the mixture to the reaction temperature, thereby causing the components to react to produce the desired nitrohydrocarbons.

This prior art practice was subject to a number of disadvantages. Not only is the nitration reaction an exothermic one, but it is a reaction which proceeds favorably only within a relatively narrow temperature range to give optimum yields of nitrohydrocarbons. Thus, although nitration will occur to some extent in a relatively wide temperature range between approximately 360° C. to 480° C., it is only within the relatively much narrower range of about 390° C. and 460° C. that optimum nitrohydrocarbon yields are obtained. Accordingly, it is necessary, after the initiation of the nitration reaction, to remove the heat of reaction rapidly enough and to such an extent that the favorable reaction temperature range is not exceeded and yet not to remove so much heat that the reaction mixture is cooled below its favorable reaction temperature. This thermal control was formerly accomplished by immersing the reaction chamber in a heat absorption jacket or bath such as a salt bath to absorb and convey away the excess heat of reaction. Such an operation was not only wasteful of heat and heat transfer, but due to the extreme rapidity of the reaction it was often impossible to remove the generated heat rapidly enough to prevent high temperatures from being reached, with resulting lower nitrohydrocarbon yields.

Another disadvantage of the prior art practice was the low mole ratios of hydrocarbon to nitric acid that could be economically employed with the prior practice of mixing the vapors before passing them into the reaction chamber. The higher the mole ratio of hydrocarbons to nitric acid, up to perhaps 40 to 1, the higher the yield of nitrohydrocarbons. But these high mole ratios were uneconomic to maintain in the prior art system, because of the excessive amounts of unreacted hydrocarbons which had to be recovered from the reaction products. In the prior art practice, the highest mole ratios of hydrocarbon to nitric acid which could be economically used was about 6 to 1.

In my joint patent, U. S. Patent No. 2,418,241, is described a marked improvement in the above described process, wheheby the reactants are mixed, the nitric acid reactant vaporized, and the reaction effected all in a single combined vaporizer-reaction chamber. In accordance with the process described and claimed in that patent, only the hydrocarbon reactant is preheated, and then successive limited portions of liquid nitric acid of predetermined concentration are mixed therewith. The heat of the ensuing nitration reaction is utilized to vaporize additional nitric acid, and is thus dissipated and largely controlled within the reaction system to maintain the temperature within the narrow optimum range necessary for best nitration results.

While the process disclosed in the above patent constituted a decided improvement over all prior art methods for the production of nitrohydrocarbons, it likewise is subject to certain material disadvantages. In order for the reaction temperature to be effectively controlled, the nitric acid used in that process must necessarily be of a concentration within the range of 70–80%. When less concentrated nitric acid is used, the heat of reaction (between nitric acid and hydrocarbons) does not furnish sufficient heat, even when combined with that heat introduced by the preheated hydrocarbon, to maintain the temperature high enough for effective vaporization of nitric acid and for the reaction of the nitric acid with the hydrocarbons to take place. In other words, when dilute nitric acid is used, a substantial portion of the heat is required to vaporize the water contained in the acid and it therefore becomes necessary to add additional external heat. Owing to the high heat of the vaporization of water, it is not feasible to vaporize dilute nitric acid at a rate sufficient to provide the desired ratio of nitric acid to the quantity of hydrocarbon fed, if all the heat is to be supplied in the form of sensible heat with the hydrocarbon. To do so would require heating the hydrocarbon to such an excessive high temperature as to cause its substantial decomposition.

It is therefore necessary in the above process to use nitric acid in at least about 70-80% concentration by weight. Such acid, unfortunately, is substantially more expensive than the less concentrated acid, and cannot be used ordinarily for economic reasons. On the other hand, it is difficult to supply a major portion of the required heat through the reactor walls, owing to the poor heat transfer, particularly if the reactor is supplied with a corrosion-resistant inner liner. Moreover, in order to transfer any large quantity of heat through the walls, it would be necessary to heat the walls to a substantially higher temperature than the mixture of reactants, thus producing a localized overheating of the materials nearest the walls, which is known to have a highly detrimental effect on the reaction.

I have now found that the process described and claimed in U. S. Patent No. 2,418,241 may be operated efficiently and economically, with 40-70% nitric acid, by introducing oxygen, air or other gaseous mixtures containing free oxygen into the reactor as hereinafter specified. In accordance with my invention the optimum temperatures are maintained in the reactor at all times by the introduction of gases containing free oxygen, which upon reaction with portions of the hydrocarbon releases the required heat in situ.

I have found that my improved process is particularly adapted to the nitration of the lower saturated hydrocarbons, including straight-chain, branched-chain, and cyclic saturated hydrocarbons having not more than eight carbon atoms in the molecule. As specific examples of such hydrocarbons may be cited, methane, ethane, propane, n-butane, 2-methylpropane, n-pentane, neopentane, 2,2,3-trimethylpentane, and n-octane; cyclopropane, cyclobutane, cyclohexane, methylcyclohexane, and dimethyl cyclohexane.

In one specific embodiment of my invention, the vaporization of nitric acid and the reaction of the nitric acid vapors with a hydrocarbon gas is carried out in the apparatus diagrammatically represented by Figure I. Nitric acid is pumped through pipe 4 supported by flange 5 into spray nozzle 6, from which it emerges as a fine mist into an elongated cylindrical vessel 8, equipped with a corrosion-resistant inner liner 9, an electrically insulating outer covering 12, a spiral winding 13 of resistance wire as a supplementary heat source if additional heat is desired, and an outer covering 14 of a thermal-insulating material. A temperature recorder and controller 16 is also provided, connected to thermocouples 15. The recorder and controller 16 are set so that when the temperature within the reactor falls below a predetermined figure, valve 17 is opened to allow the oxygen-containing gas to be introduced through pipe 2. Likewise when the temperature is raised to the predetermined figure by the liberation of heat from the oxidation of hydrocarbons, valve 17 is closed by the operation of temperature controller 16 to cut off the supply of air. The preheated hydrocarbon gas is introduced through pipe 1. Overheating of the spray nozzle by the hot hydrocarbon gas is prevented by a cylindrical spray-nozzle protection baffle 7. Mixing of the hydrocarbon gas, oxygen-containing gas and nitric acid mist takes place below the cylindrical spray protection baffle 7, whereupon the heat supplied by the entering gas and by the electrical resistance coil around the reactor, if such a coil is used, and by the partial oxidation of the hydrocarbon gas brings about the vaporization of the nitric acid and initiates the nitration reaction. Since the nitration reaction is exothermic, the temperature may, after the reaction has proceeded for a time, exceed the predetermined setting, causing controller 16 to stop the flow of oxygen-containing gas by closing valve 17. The temperature is therefore controlled throughout the process by the introduction of oxygen-containing gas only as it is required to maintain the temperature within the predetermined range.

The reaction mixture passes out of the apparatus through pipe 11, supported by flange 10, and is rapidly cooled and subsequently treated to separate the various constituents.

Alternatively, I may introduce the oxygen-containing gas as a mixture with the preheated hydrocarbon gas through pipe 1 or 2. Or, I may introduce all or part of the oxygen-containing gas within the cylindrical spray nozzle protection baffle 7 through pipe 3 supported by flange 5. In the latter modification, the introduction of cold gas through pipe 3 is a particularly effective means for preventing any tendency of the spray nozzle 6 to overheat.

A useful modification of the above apparatus comprises providing means for cooling the reactants after the initiation of the nitration reaction, such as by jacketing the lower portion of the reactor with a heat-transfer liquid; or by constructing the lower portion in the form of a tube or coil and immersing it in a salt bath maintained at a suitable temperature; or by quenching with a cooler gas, such as steam, additional hydrocarbon or an inert gas.

In another specific embodiment on my invention, the vaporization of nitric acid and the reaction of the nitric acid vapors with a hydrocarbon gas is carried out in an apparatus represented by Figure II. This apparatus comprises a reaction chamber or chambers 10, desirably insulated by jackets 11, the chambers being arranged either as several separate connecting units as in Figure II, or as a single unit. A preheater 12 for heating the hydrocarbon reactants comprises any suitable heating element and an inlet 19 for the cold alkane. A gas conveyor 13 leads to hydrocarbon inlet 21 of reaction chamber 10. Reaction chamber 10 is further provided with a primary inlet 14 for the first injection of liquid nitric acid disposed in the path of the incoming gaseous reactant and slightly beyond the hot gas inlet. Other supplementary reactant inlets 22 are disposed at intervals through the extent of the reaction chamber, or in each of the several connecting chambers. External heaters 15 may be disposed at intervals, if desired. A temperature recorder and controller 17 is also provided, connected to thermocouples 26. The temperature controller 17, is also connected with, and controls a valve 30 which in turn controls the introduction of oxygen-containing gases, through pipe 16, as needed. A corrosion resistant lining 23 may be provided within the reaction chamber 10. Beyond the reaction chamber or chambers, a cooling chamber 28 is positioned, through which the reacted vapors are withdrawn through outlet 29 to subsequent recovery. In operation, the hydrocarbon, either gaseous or liquid, enters preheater 12 through inlet 19 and passes through heat exchanger 20 which is heated by heating element 18. The hot gaseous hydrocarbon, heated to a suitable temperature within the favorable reaction temperature range, passes out of the preheater and is led through conveyor 13 to inlet 21 of reaction chamber 10. The reaction chamber may be a single unit with a plurality of inlets for the nitric acid or may comprise a plurality of units as shown, for greater flexibility in controlling the reaction. The liquid nitric acid is introduced in atomized form into the reaction chamber at liquid inlet 14 slightly beyond the vapor inlet, and is vaporized and raised to the reaction temperature by the hot gases, whereupon the vaporized liquid immediately reacts with the hot gaseous hydrocarbon, generating heat. As the temperature drops below the predetermined figure, due to the excessive heat required to vaporize the nitric acid, temperature controller 17 causes valve 30 to open, oxygen-containing gases are introduced through pipe 16, and the needed heat is released in situ by oxidation of a portion of the hydrocarbon.

If a plurality of interconnected reaction chambers is utilized, and nitric acid introduced in each, additional thermocouples 26, temperature controllers 17, valve 30, and pipes 16 are provided to introduce oxygen-containing gases into each chamber.

The rate of flow of hydrocarbon is regulated relative to the rate of addition of nitric acid such that the effective mole ratios of hydrocarbon to nitric acid are in excess of 6 to 1 and preferably considerably higher, preferably between about 10 to 1 and 40 to 1. Relatively somewhat higher mole ratios should be used in the case of methane and ethane than with the other lower hydrocarbons because of the lower specific heat of these two hydrocarbon members. For the lower hydrocarbons other than methane and ethane, a mole ratio between about 20 to 1 and 30 to 1 is generally to be preferred while with the lower members the optimum effective mole ratio is somewhat higher.

The number of additions of acid will in general determine the overall mole ratio system, that is, the mole ratio of a quantity of hydrocarbon with respect to the total quantity of nitric acid introduced in all the several reaction chambers or at the successive intervals in a single reaction chamber. From the point of view of recovery of unreacted hydrocarbons, it is desirable to operate at as low as possible overall ratio of hydrocarbon to nitric acid, and therefore, to resort to as many successive additions of nitric acid as possible. However, the number of successive additions is limited by the fact that as more hydrocarbon reacts to form nitrohydrocarbon, the larger the proportion of hydrocarbon which comes in contact with fresh nitric acid and when this concentration reaches a high enough point, reaction and decomposition of the nitrohydrocarbon begins to take place. The number of additions should be limited so as to maintain an overall ratio of hydrocarbon to nitric acid of not more than about 6 to 1, but preferably not less than about 3 to 1 as the presence of about this excess of hydrocarbon is necessary to foster efficient progress of the reaction.

The rate of introduction of nitric acid and hydrocarbon and the ratio of nitric acid to hydrocarbon remains constant throughout the operation of the process for best results. Only the introduction of the oxygen-containing gas need be varied, that is, larger quantities are introduced when the temperature drops considerably, while smaller quantities are introduced to correct slight drops in temperature.

Still another variation of my invention lies in its application to the so-called fluid bed type nitrator. One modification of this type reactor is diagrammatically shown in Figure III. In accordance with this process, a mixture of hydrocarbon and either nitric acid or nitrogen dioxide in the required reacting proportions is passed upwardly through a mass of fluidized, heated, finely-divided solid material in such manner as to cause the latter to behave like a liquid. The particles should preferably be powdered silica glass having a size within the range 0–200 microns. By passing the reactant mixture upwardly through the finely-divided mass of solid particles of substantially uniform size, and by suitably regulating the rate of flow, the particles assume limited freedom of motion and the whole has the appearance and physical properties similar to those of a boiling liquid.

Referring to Figure III, the finely-divided inert is stored in the powder storage 3. The reactor 9 is preferably constructed in two sections, the lower of which contains a heating element 6. The upper portion 12 of the reactor contains filters to prevent the loss of the fluidizing agent. In order to start the operation, the heater 6 is started and powder blown from the storage tank 3 through line 4 into the reactor tube, preferably by means of hydrocarbon gas passed into the powder storage tank through line 2. As soon as the lower section 6 of the reactor is partially filled with powder, the flow of preheated hydrocarbon gas is started through line 5. Introduction of the powder and hydrocarbon is continued until the reactor tube is filled to the proper height with the fluidized mass. When this condition is reached and the fluidized mass is heated to the desired reaction temperature, the flow of liquid nitric acid is started into the convertor through the line 1, the acid being admitted into the convertor through either or all valves (7, 8, 10 and 11). The reaction then proceeds with additional heat being liberated as required, in situ, by oxidation of hydrocarbon gas. For temperature control, the reactor is equipped with thermocouples 17, connected to a temperature recorder and controller 18. When additional heat is required, that is when the temperature in the reaction zone falls below a predetermined figure, controller 18 causes valve 19 to open, thus permitting oxygen to enter the reactor through line 20.

After completion of the reaction, the reaction gases pass through line 13, then to cooler 14 where the temperature of the gases is lowered as rapidly as possible and then passed into the condenser 15 where the liquid condensate is recovered through line 16.

It is distinctly understood that the apparatus are purely illustrative, and are in no way intended to limit the application of my process to any specific types of apparatus.

I have found that, in any of the nitrators specified, the temperature of the reaction chamber will be raised to the desired reaction temperature when air or other free oxygen-containing gas is added, only if the temperature is above about 250° C. before the addition of the free oxygen. At temperatures below about 250° C., oxidation of the hydrocarbons proceeds very slowly, even in the presence of vaporized nitric acid. It is therefore necessary to raise the temperature to above about 250° C. before introducing the free oxygen. This may be accomplished by applying additional external heat, preheating the entering hydrocarbon gas, and the like.

In the nitration of hydrocarbons by my process I have found that the addition of gases containing free oxygen to the reaction mixture for the purpose of supplying additional heat when required produces no substantial alteration in the reaction conditions required for the maximum output of nitrohydrocarbons. Pressures ranging from atmospheric up to as high as 1,000 lbs. per sq. in. have been found suitable. The operative maximum temperatures within the reaction zone vary somewhat depending on the hydrocarbon, and the contact time is an inverse function of the temperature. Of the three lowest boiling hydrocarbons, the following approximate ranges are suitable:

|  | Seconds |
|---|---|
| Methane 375–550° C | 10–0.005 |
| Ethane 300–500° C | 10–0.005 |
| Propane 300–500° C | 10–0.001 |

In general, best results are obtained when the reaction temperature is maintained within the range 390–460° C.

The proportion of oxygen-containing gas and the temperature to which the hydrocarbons and the oxygen-containing gas should be preheated are interdependent variables that are greatly affected by the concentration of nitric acid, the type of hydrocarbon, and the rate of heat loss from the walls of the vaporizer-reactor vessel. It is necessary to supply sufficient heat in the form of sensible heat of the entering gases, the heat of combustion of a portion of the hydrocarbons, and, if desired, heat from an auxiliary external or internal electrical resistance coil, to vaporize the nitric acid completely and to heat the resultant mixture of gases to the temperature at which the nitration reaction is initiated, as specified above. The specific heats and the heats of combustion of the various hydrocarbons, and the specific heat and heats of vaporization of water and nitric acid, are readily available in the literature, and it will be obvious to those skilled in the art how to carry out such calculations. The following specific examples illustrate the coordination of the several variables in my process:

EXAMPLE I

Into an apparatus, constructed as illustrated in Figure I, and having a Duriron corrosion-resistant liner 9 measuring 24 inches in length and having an inside diameter of 2.5 inches, were pumped 8.5 pounds per hour of aqueous 46% nitric acid. Concurrently there was introduced 450 cu. ft./hr. of propane preheated to 400° C. The pressure within the apparatus was maintained at 75 p. s. i. gage. Air, preheated to 350° C. was introduced, as required, to maintain the temperature of reaction at about 420° C. An average of 40 cu. ft./hr. of air was required for this purpose. As the product emerged from the bottom of the apparatus, it was rapidly cooled, and from it was separated 7.85 pounds per hour of an organic layer having the following composition:

|  | Per cent by weight |
|---|---|
| Low boilers | 13.1 |
| Nitromethane | 13.8 |
| Nitroethane | 16.2 |
| 2-nitropropane | 32.0 |
| 1-nitropropane | 38.0 |

From the foregoing results, it was calculated that the nitrohydrocarbons had been produced in a conversion of 31% of theory, based on the nitric acid fed into the reactor.

EXAMPLE II

This run was made in an apparatus constructed as illustrated in Fig. II, except that 5 separate connecting units were arranged side by side. 10,500 cu. ft./hr. of natural gas, preheated to 460° C., was introduced into the first unit at inlet 21. Cold 70% nitric acid was pumped to each inlet (14 and 22) at the rate of 57.1 lbs. per hour. To maintain steady temperatures throughout the reactor, that is to hold the exit end of each vaporizer-reactor at approximately 455° C., air was introduced through inlets 16 as required. The air consumption averaged 563 ft.³/hr. A product having the following composition was withdrawn from the last unit:

|  | Per cent |
|---|---|
| Low boilers | 3.1 |
| Nitromethane | 45.6 |
| Nitroethane | 26.5 |
| 2-nitropropane | 9.8 |
| 1-nitropropane | 10.8 |
| Nitrobutane | 4.2 |

The average conversion to nitroalkanes, based on nitric acid fed, was 15.8%.

EXAMPLE III

A series of runs was made in the same apparatus described in Example II, under the conditions and with the results shown in the following table:

Table I

| Hydrocarbon Composition | Hydrocarbon Fed CFH | Acid Strength, Wt. Per Cent | Acid Fed Pounds 100% per hour | Contact Time, Seconds | Ave. Air Consumption CFH | Ave. Temp., °C. | | Average Conversion HNO₃ to NP's |
|---|---|---|---|---|---|---|---|---|
| | | | | | | Center of Section | End of Section | |
| Natural gas | 10,500 | 67 | 181 | .257 | 865 | 442 | 466 | 9.48 |
| Do | 10,180 | 66 | 213 | .255 | 865 | 443 | 465 | 12.67 |
| Do | 10,660 | 64 | 198 | .249 | 808 | 437 | 464 | 12.18 |
| 91.6% Nat. gas+8.4% propane | 10,980 | 64 | 189 | .251 | 478 | 432 | 457 | 21.30 |
| 84.3% Nat. gas+15.7% propane | 10,820 | 64 | 274 | .241 | 478 | 420 | 450 | 19.88 |
| Propane | 10,100 | 55 | 389 | .1711 | 4,920 | 443 | 466 | 34.7 |
| Do | 11,120 | 59½–60 | 413 | .1917 | 1,490 | 423 | 444 | 32.5 |
| Do | 11,200 | 62 | 457 | .1794 | 2,600 | 430 | 452 | 34.1 |
| Do | 11,140 | 64 | 432 | .1969 | 1,780 | 410 | 437 | 36.8 |
| Do | 10,920 | 68 | ¹449 | .2100 | 1,700 | 427 | 450 | 37.0 |

¹ Only 4 acid spray units used.

The foregoing examples are illustrative only, and are not to be construed as limiting my invention to the specified apparatus, steps, or materials. In general, it may be said that any modifications or equivalents that would ordinarily occur to those skilled in the art are to be considered as lying within the scope of my invention.

I claim:
1. In the manufacture of lower nitrohydrocarbons by nitration of low-molecular saturated hydrocarbons, the improvement which comprises regulating the reaction temperature by the introduction of regulated amounts of a gaseous mixture containing free oxygen whereby the desired increase is produced by reaction with the hydrocarbons.

2. In the manufacture of lower nitrohydrocarbons by nitration of low-molecular saturated hydrocarbons, the improvement which comprises maintaining the reaction temperature within the range 390–460° C. by the introduction of regulated amounts of a gaseous mixture containing free oxygen whereby the desired increase is produced by reaction with the hydrocarbons.

3. In a continuous process for manufacturing lower nitrohydrocarbons by the vapor-phase nitration of low-molecular saturated hydrocarbons, the improvement which comprises introducing regulated amounts of a gaseous mixture containing free oxygen into the reaction zone to maintain a predetermined temperature within the range 390–460° C. whereby the desired increase is produced by reaction with the hydrocarbons.

4. In a continuous process for manufacturing lower nitrohydrocarbons by the vapor-phase nitration of low-molecular saturated hydrocarbons, the improvement which comprises maintaining the temperature of reaction within the range 390–460° C. by introducing a gaseous mixture containing free oxygen into the reaction zone when said reaction temperature drops to a predetermined temperature below this desired range, said oxygen being added in quantities sufficient to bring said temperature within the range 390–460° C. upon reaction with said hydrocarbons.

5. In a continuous process for manufacturing lower nitrohydrocarbons by the vapor-phase nitration of low-molecular saturated hydrocarbons, the improvement which comprises maintaining the temperature of reaction at a predetermined temperature within the range 390–460° C. by introducing a gaseous mixture containing free oxygen into the reaction zone when said reaction temperature drops to a predetermined temperature below this desired range, said oxygen being added in quantities sufficient to bring said temperature within the range 390–460° C. upon reaction with said hydrocarbons.

6. In a continuous process for manufacturing lower nitrohydrocarbons by heating low-molecular saturated hydrocarbons to a temperature within the range of about 390–460° C., continuously passing the heated hydrocarbons in vapor form into one end of an elongated reaction zone, introducing liquid nitric acid having a concentration between about 40–70%, in a finely divided state into said reaction zone in contact with the heated hydrocarbon, whereby said nitric acid is vaporized and reacts with said hydrocarbon, the improvement which comprises maintaining the reaction temperature between about 390–460° C. by introducing a gaseous mixture containing free oxygen into said reaction zone when said reaction temperature drops to a predetermined temperature within the range 250°–460° C. said oxygen being added in quantities sufficient to bring said temperature of the reaction zone within the range 390–460° C. upon reaction with said hydrocarbon.

7. In a continuous process for manufacturing nitropropanes by heating propane to a temperature within the range of about 390–460° C., continuously passing the heated propane in vapor form into one end of an elongated reaction zone, introducing liquid nitric acid having a concentration between about 40–70%, in a finely divided state into said reaction zone in contact with the heated propane, whereby said nitric acid is vaporized and reacts with said propane, the improvement which comprises maintaining the reaction temperature between about 390–460° C. by introducing a gaseous mixture containing free oxygen into said reaction zone when said reaction temperature drops to a predetermined temperature within the range 250–460° C., said oxygen being added in quantities sufficient to bring said temperature of the reaction zone within the range 390–460° C. upon reaction with said propane.

8. In a continuous process for manufacturing lower nitrohydrocarbons by passing nitric acid and low-molecular saturated hydrocarbons through a fluidized mass of heated finely divided silica glass, the improvement which comprises regulating the reaction temperature by the introduction of regulated amounts of a gaseous mixture containing free oxygen whereby the desired increase is produced by reaction with the hydrocarbons.

9. In a continuous process for manufacturing lower nitrohydrocarbons by passing nitric acid and low-molecular saturated hydrocarbons through a fluidized mass of heated finely divided silica glass, the improvement which comprises maintaining the temperature of reaction within the range 390–460° C. by introducing regulated amounts of a gaseous mixture containing free oxygen whereby the desired increase is produced by reaction with the hydrocarbons.

10. In a continuous process for manufacturing lower nitrohydrocarbons by passing nitric acid and low-molecular saturated hydrocarbons through a fluidized mass of heated finely divided inert solids, the improvement which comprises maintaining the temperature of reaction within the range 390–460° C. by introducing a gaseous mixture containing free oxygen into the reaction zone when the reaction temperature falls to a predetermined temperature within the range 250–460° C., said free oxygen being added in quantities sufficient to bring said temperature within the range 390–460° C. upon reaction with hydrocarbon.

11. In a continuous process for manufacturing lower nitrohydrocarbons by passing nitric acid and low-molecular saturated hydrocarbons through a fluidized mass of heated finely divided silica glass, the improvement which comprises maintaining the temperature of reaction within the range 390–460° C. by introducing a gaseous mixture containing free oxygen into the reaction zone when the reaction temperature falls to a predetermined temperature within the range 250–460° C., said free oxygen being added in quantities sufficient to bring said temperature within the range 390–460° C. upon reaction with said hydrocarbon.

12. In a continuous process for manufacturing nitropropanes by passing nitric acid and propane through a fluidized mass of heated finely divided inert solids, the improvement which comprises maintaining the temperature of reaction within the range 390–460° C. by introducing a gaseous mixture containing free oxygen into the reaction zone when the reaction temperature falls to a predetermined temperature within the range 250–460° C., said free oxygen being added in quantities sufficient to bring said reaction temperature within the range 390–460° C. upon reaction with said propane.

13. In the manufacture of lower nitrohydrocarbons, the process which comprises preheating propane to a temperature of about 400° C. preheating air to a temperature of about 350° C. continuously passing these preheated gases at a pressure of about 75 pounds per square inch into an elongated reaction zone, continuously spraying aqueous nitric acid having a concentration of about 46% into the mixture of propane and air in said zone; the said propane, air and nitric acid being passed into said reaction zone at the ratios of about 450 cubic feet per hour of propane, 40 cubic feet per hour of air and 8.5 pounds of nitric acid per hour; continuously withdrawing the resulting reaction products from said reaction zone and recovering nitrohydrocarbons therefrom; the conditions of the reaction being such that the reaction mixture reaches a temperature of about 370° C. after complete vaporization of the nitric acid and a temperature of about 420° C. before passing out of the reaction zone.

LEONARD A. STENGEL.

No references cited.